United States Patent [19]

Harvest

[11] Patent Number: 5,093,771
[45] Date of Patent: Mar. 3, 1992

[54] INVERTER CIRCUIT AND A METHOD FOR CONTROLLING SAME

[75] Inventor: Nils-Ole Harvest, Nordborg, Denmark

[73] Assignee: Danfoss A/S, Nordborg, Denmark

[21] Appl. No.: 461,826

[22] Filed: Jan. 8, 1990

[30] Foreign Application Priority Data

Jan. 14, 1989 [DE] Fed. Rep. of Germany ....... 3901034

[51] Int. Cl.$^5$ .......................................... H02M 7/5387
[52] U.S. Cl. ....................................... 363/98; 363/58; 361/91
[58] Field of Search ................. 363/41, 56, 57, 58, 363/98, 132; 361/90, 91, 94, 111

[56] References Cited

U.S. PATENT DOCUMENTS 4,617,622 10/1986 Fox ................................... 363/58 X
4,739,465 4/1988 Asano et al. .......................... 363/56

Primary Examiner—Steven L. Stephan
Assistant Examiner—Emanuel Todd Voeltz
Attorney, Agent, or Firm—Wayne B. Easton

[57] ABSTRACT

An inverter circuit which converts d.c. from a d.c. source to single or multiple phase a.c.. Two semiconductor switching elements for each phase are connected in series between two poles of a d.c. source. A signal generator provides a pulse width modulated signal for operating the switching elements. Blocking elements are provided between the signal generator and the switching elements. A control circuit senses current flow at the a.c. output and selectively enables the blocking elements in accordance with the direction of the current flow to prevent short circuiting between the switching elements.

6 Claims, 1 Drawing Sheet

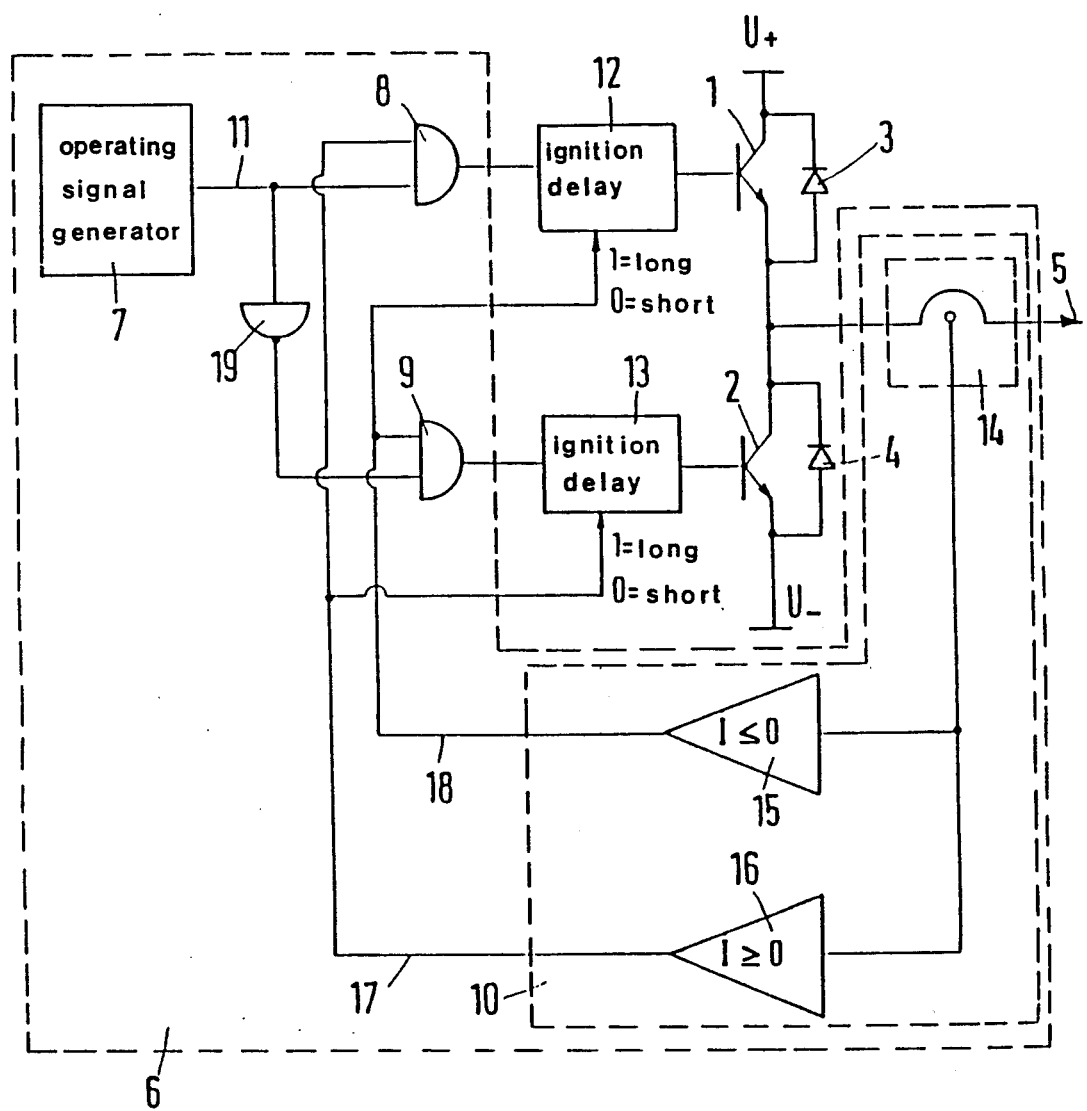

INVERTER CIRCUIT AND A METHOD FOR CONTROLLING SAME

The invention relates to an inverter circuit which converts d.c. from a d.c. source to at least single phase a.c., comprising two semiconductor switching elements for each phase connected in series between the two poles of the d.c. source, wherein a recovery diode in parallel with each semiconductor switching element is disposed in the blocking direction in relation to the d.c. source and an a.c. outlet is disposed between the two semiconductor switching elements, and comprising a control circuit for operating the semiconductor switching elements with a pulse width-modulated operating signal. The invention also relates to a method of operating an inverter circuit which converts d.c. to at least single phase a.c. and in each phase comprises two semiconductor switching elements with parallel-connected recovery diodes connected between the two poles of the d.c. source, wherein the a.c. can be derived at an a.c. outlet between the two semiconductor switching elements and the latter are operated with a pulse width-modulated operating signal.

A known inverter circuit (U.S. Pat. No. 4,617,622) is operated with a pulse width-modulated signal and a control circuit. The signal of this control circuit can assume the logic values zero and one. At the value one, the semiconductor switching element connected to the plus pole of the d.c. source is brought to a conductive state and the semiconductor switching element connected to the minus pole is brought to a blocked state, the reverse being the case for the value zero. Operation takes place by way of the rising or falling flank of the operating signal. The scanning ratio, i.e. the ratio of the duration in one period for which the signal has the value one to the entire length of the period governs the voltage at the a.c. outlet. The voltage at the a.c. outlet referred to the voltage of the negative pole of the d.c. source corresponds to the voltage difference between the two poles of the d.c. source multiplied by the scanning ratio. If, for example, the d.c. source is constructed symmetrically, i.e. the voltage of the negative pole amounts to exactly the same as the voltage of the positive pole, the voltage zero is obtained at the a.c. outlet with a scanning ratio of 0.5. By means of variations in time for the scanning ratio, e.g. in the form of a sine curve, one can achieve a variation in the time for the output voltage of the inverter, provided that the period of pulse width-modulation is considerably shorter than the period of the sine curve. In other words, the modulation frequency must be substantially higher than the frequency of the a.c.

In the ideal case, the inverter output voltage is exactly proportional to the scanning ratio of the pulse width-modulated signal. In reality, however, all controllable semiconductor switching elements require a certain time to switch off. This switching off period is calculated from the instant at which the switching element is to be brought to the switched-off condition by the operating signal, e.g. by a transition from the value one to the value zero, up to the instant at which the current through the switching element disappears, i.e. the switching element is indeed blocked. In contrast, the switching on period, i.e. the time before arrival of the "operating" signal, e.g. by a rising flank of the operating signal from the value zero to the value one, up to reaching the full current is markedly shorter. This phenomenon is particularly apparent for certain types of bipolar transistors.

In U.S. Pat. No. 4,617,622, each control line therefore includes in front of each semiconductor switching element retarding means which delay the ignition, i.e. opening or operation, of the semiconductor switching element by a time which must be at least as large as the switching off period of the other switching element. If the delay period were to be shorter, the one switching element will be operated whilst the other is not yet closed and for every operation there would be a short circuit between the two poles of the d.c. source. To avoid undesirable harmonics, a further retarding element is introduced in the signal path of the pulse width-modulated operating signal, its delay being variable and being reduced proportionally to the load current. With a positive current, the delay takes place only at the falling flank and with a negative current only at the rising flank. This system is particularly suitable for compensating a linear current dependency in the switching off period of the semiconductor.

The switching off period of the semiconductor switching elements vary over a large range depending on many factors, including the type and make of semiconductor, statistic scattering, i.e. differences between individual specimens of semiconductors of the same type and the same make, temperature variations, the switching off period being higher with a rise in temperature, and load current. In addition, there must be an adequate safety margin, whereby the ignition delay in most operating conditions is considerably longer than the actual switching off period of the semiconductors. Conventionally, each retarding means retards the operating signal by a period which is three to four times larger than the actual switching off period of the semiconductor.

However, the excessively long retardation results in the actual scanning ratio no longer corresponding to the desired scanning ratio. Accordingly, the inverter output voltage no longer exactly follows the predetermined course but is smaller than desired for a positive direction of current at the inverter output and larger than desired for a negative direction of current at the inverter output. Positive current direction means that the current flows out of the inverter output when the switching element is open or operated and negative direction of current means that it flows into the inverter output. With an ohmic load on the inverter, i.e. no phase displacement between the current and voltage (cos $\phi = 1$), the amplitude of the a.c. output voltage is reduced relatively to the predetermined value, whereas with an inducted load (cos $\phi = 0$), the amplitude of the output voltage corresponds to the predetermined voltage.

This phenomenon is of particular disadvantage when operating asyncronous motors with variable frequency. Especially at low frequencies where the amplitude of the voltage of the basic wave is also low, even a small voltage loss will be found disruptive because the torque of the motor is very much reduced at an excessively low voltage. However, it will be known that especially on starting from standstill a high torque is desirable. Normally, the problem is resolved by correcting the scanning ratio of the pulse width-modulated operating signal in the control circuit so that the voltage is increased. This alleviates the problem of an excess of the low torque but causes the motor to be fed with an excess of the high voltage in the unloaded condition because cos φ drops when the torque is reduced. This, in turn, results in the motor requiring an inappropriately high idling current at a low frequency, thereby increasing the danger of overheating. Conventional I×R compensation at which the voltage is increased depending on the load current will not solve the problem because there is no clear relationship between current and cos φ. It has also been tried to reduce the modulation frequency of the pulse width-modulated operating signal. However, this leads to higher losses and more noise in the motor, so that it is still preferred to keep the modulation frequency as high as possible.

For this reason, it is the object of the present invention to provide an inverter circuit of the aforementioned kind that produces the predetermined output voltage independently of cos φ given by the load and independently of the direction of current.

This object is achieved in an inverter circuit of the aforementioned kind in that the control circuit controls with the operating signal only the semiconductor switching element of one phase into a pass condition which connects that pole of the d.c. source to the a.c. outlet of which the polarity corresponds to that of the current flowing at the a.c. outlet, and the other semiconductor switching element blocks independently of the operating signal.

Thus, according to the invention, no short circuits can occur between the positive and negative pole of the d.c. source. Accordingly, the semiconductor switching elements can be operated without regard to the possible occurence of a short circuit situation. It is therefore not necessary to provide an excessively long delay in the signal path of the operating signal for changing the scanning ratio, whereby the output voltage can more accurately follow the desired course. Since no voltage losses are created, there is also no dependence of such losses on cos φ or on the current direction.

In a preferred embodiment, the control circuit comprises blocking means which are either released by a control logic depending on the polarity of the current at the a.c. outlet to operate the operating signal at the semiconductor element or are blocked. If the blocking means are released, they open a signalling path for the operating signal which can then influence the control electrode of the semiconductor switching element. This embodiment enables a very simple control to be achieved for the inverter circuit. The operating signal can be produced in the same way as hitherto. No complicated changes are necessary at the operating signal generator. If undesirable because of the condition of the circuit, the operating signal is simply not permitted to pass to the semiconductor switching element.

Advantageously, the blocking means are in the form of AND gates of which the outlet communicates with the respective control electrode of the associated semiconductor switching element of which the one inlet is influenced by the operating signal for the associated semiconductor switching element and the other input in influenced by an outlet signal of the control logic. AND gates are particularly easy to use as blocking means. As long as the one inlet is influenced by a corresponding signal, for example a logic one, the signal of the other inlet will appear at the outlet. On the other hand, if the AND gate at the first inlet is fed with the logic value zero, the value zero will also appear at the outlet, regardless of the cause of the signal at the other inlet.

With advantage, a respective retarding means disposed between each blocking means and the associated semiconductor switching element retards by a predetermined delay period that part of the operating signal which brings about operation of the semiconductor switching element. The part of the operating signal which operates the semiconductor element is for example the rising flank for the semiconductor switching element connecting the positive pole of the d.c. source to the inverter outlet and for example the falling flank of the operating signal for the other semiconductor switching element which connects the negative pole of the d.c. source to the inverter outlet. This construction has the following advantage. When the switching on period, i.e. the time from arrival of the respective flank of the operating signal up to full current flow is substantially shorter than the switching off period, the scanning ratio would become larger than desired, with the result that there is an excessively high output voltage at the inverter outlet. By incorporating a delay period, this phenomenon can be compensated to a large extent.

Advantageously, the retarding means can be changed over between a shorter and a longer delay period. As already mentioned, the switching off period depends interalia on the current strength. Depending on the load, one can then select a shorter or a longer delay period for the switching off compensating period if the dependence of the switching off period of different currents is to be taken into consideration.

However, it is particularly preferred for the changeover to be carried out by the control logic depending on the polarity of the current at the inverter outlet, the retarding means for the semiconductor switching element which is to be driven to the pass condition being changed over to the shorter delay period. This ensures that it will always be the switching element which is to be momentarily conductive that will be influenced by the shorter delay period. If an error causes the other semiconductor switching element to be changed over during the next change of the level of the operating signal, i.e. during a rising or falling flank, changing over will there take place over a correspondingly longer delay period so that here, too, a short circuit condition can be reliably avoided.

In a narrow range of current about zero, it is often difficult to determine the polarity of the current. For this reason, the control logic releases the blocking means of both semiconductor switching elements at a value of the alternating current in a predetermined range above and below zero. Consequently, both switching elements are fed with operating signals. No losses are likely because the current is practically zero.

It is of advantage for the control logic to change the retarding means over to the longer delay period when both blocking means are released. For safety reasons, the one semiconductor switching element can then ignite only when the other is reliably closed. The losses that can occur during this time are not, as stated above, significant because practically no current is flowing.

Advantageously, the control logic comprises means for detecting the direction and amount of the current flowing at the inverter outlet, and comparator means which produce a releasing signal for one of the two blocking means when the current is not less than zero and a releasing signal for the other blocking means when the current is not larger than zero. Both signals are therefore produced when the current is substantially zero. This is a simple way of ensuring that in the narrow range of the current value around zero both semiconductor switching elements are operative.

Preferably, the releasing signal for the blocking means of the one semiconductor switching element changes the retarding means of the other semiconductor switching element from the shorter to the longer delay period. As a result, at the instant when both semiconductor switching elements can be fed with operating signals because both blocking means are released, the longer delay period will also always be switched on.

In a preferred embodiment, the inverter circuit produces a three-phase alternating current of which the phases are electrically displaced by 120° each. This embodiment is employed with particular advantage for three-phase a.c. motors, particularly asychronous machines.

In a method of the aforementioned kind, the problem is solved in that, as long as the current at the inverter outlet has the one polarity, only that semiconductor switching element is fed with the operating signal which connects the a.c. outlet to the pole of the same polarity, whilst the other one remains blocked.

A preferred example of the invention will now be described in conjunction with the drawing in which the single FIGURE illustrates a single phase inverter.

The inverter comprises two semiconductor switching elements 1, 2 connected in series between the two poles $U_+$, $U_-$ of a d.c. source. Parallel to each semiconductor switching element 1, 2 there is a respective recovery diodes 3, 4. Both recovery diodes 3, 4 are poled in the blocking direction in relation to the voltage direction of the d.c. source. Between the two semiconductor switching elements, an alternating current can be tapped at the inverter outlet 5.

Each semiconductor switching element 1, 2 is fed with an operating signal by way of a control circuit 6. The control circuit 6 comprises an operating signal generator 7 which produces the operating signal 11. This operating signal is a pulse width-modulated signal with two logic values zero and one. The one semiconductor switching element 1 which connects the positive pole $U_+$ of the d.c. source to the a.c. outlet 5 is brought to a conductive condition by a change in the operating signal from the level zero to the level one, i.e. it is ignited or operated, whereas the other semiconductor switching element 2, which connects the negative pole $U_-$ of the d.c. source to the a.c. outlet 5 is ignited or operated by a change in the level from one to zero. After ignition, the operated semiconductor switching element 1,2 continues to allow current to pass or remains open until the operating signal changes the level again, i.e. returns from one to zero for the semiconductor switching element 1 or from zero to one for the semiconductor switching element 2. To enable the same semiconductor switching elements to be employed, the operating signal for the semiconductor switching element 2 is inverted by an inverter 19. However, the falling or rising flank does not immediately block the respective semiconductor switching element 1, 2 but only introduces the blocking. Between the occurence of this flank up to actual blocking, i.e. the cessation of all current through the respective semiconductor element, there is a so-called "switching off period".

The operating signal 11 is not applied directly to the ignition electrodes of the semiconductor switching elements. Every semiconductor switching element is associated with ignition retarding means 12, 13 connected to the control electrode of the respective semiconductor switching element 1, 2. The ignition retarding means 12, 13 receive their input signal from blocking means 8, 9 in the form of AND gates. Each gate has two inlets, one of which is fed with the operating signal 11 from the operating signal of the generator 7. The other inlet of the blocking means 8, 9 is connected to a control logic 10. The control logic 10 produces at an outlet 17 a signal with the value of logic one when the current is not less than zero, i.e. larger or equal to zero. This signal is fed to the blocking means 8 for the semiconductor switching element 1 that is connected to the positive pole of the d.c. source. The other outlet of the control logic 10 carries a signal of logic one when the current is not larger than zero, i.e. equal or less than zero. This signal is fed to the blocking means 9 of the semiconductor switching element 2 that is connected to the negative pole in the d.c. source. If the outlets 17, 18 do not carry the value of logic one, they will carry the value of logic zero. To produce the signals at the outlets 17 and 18, the control logic 10 comprises a current converter 14 which detects the size and polarity of the alternating current at the a.c. outlet 5. The signal obtained by the current converter 14 is fed to a diagrammatically illustrated comparator 15 which determines whether the current is smaller or equal to zero and a likewise diagrammatically illustrated comparator 16 which determines whether the current is larger or equal to zero. Both comparators 15, 16 produce a signal level of logic one when the stated comparison is positive, i.e. when the condition is fulfilled, otherwise a signal level of logic zero.

The retarding means 12, 13 can be changed over between two differently long delay periods. This change-over takes place depending on signals in the outlet lines 17, 18 of the control logic 10. If the comparator 15 determines that the current is smaller or equal to zero, the delay period of the retarding means 12 is set to a long value. If it is determined that the condition of the comparator 15 has not been fulfilled, i.e. that the current is larger than zero, the retarding means 12 is set to a short delay period. The retarding means 13 is set to a long delay period when the comparator 16 detects that the current is larger than or equal to zero. The delay period of the retarding means 13 is, on the other hand, set to a shorter value when the comparator 16 finds that the value is smaller than zero.

Assume that the inverter is to be employed to produce a somewhat sinusoidal alternating current at the a.c. outlet 5. The operating signal generator 7 produces a pulse width-modulated operating signal 11 which is fed to the two blocking means 8, 9. The blocking means 8, associated with the semiconductor switching element 1 which connects the positive pole $U_+$ of the d.c. source to the a.c. outlet 5 is only released when the control logic 10 detects that the current at the a.c. outlet 5 is larger than or equal to zero. In this case, the operating signal 11 can reach the control electrode of the semiconductor switching element 1 through the retarding means 12, whereby the semiconductor switching element is operated. Current can therefore flow from the positive pole of the $U_+$ of the d.c. source to the a.c. outlet 5. A positive current is here created, i.e. a current which flows out of the inverter. Depending on the duration of the operating pulse of the operating signal 11 the semiconductor switching element 1 is closed again after a predetermined time. Somewhat later, namely after the switching off period has expired, the flow of current from the positive pole $U_+$ of the d.c. source to the a.c. outlet 5 ceases. With an ohmic load, at which the current and voltage are in phase, the flow of current ceases altogether. With an inductive load at the a.c. outlet 5, however, the current tends to continue to flow. So long as the upper semiconductor switching element 1 is closed, a current will accordingly flow from the negative pole U_ of the d.c. source through the recovery diode 4 into the a.c. outlet 5. The lower semiconductor switching element 2 remains closed all the time as long as a positive current flows at the a.c. outlet 5. The scanning ratio of the operating signal 11 is varied somewhat sinusoidally. Accordingly, in the positive half wave, the pulses operating the upper semiconductor switching element 1 are longer than the pauses between the pulses. The voltage of the a.c. outlet 5 therefore likewise changes sinusoidally. As long as the current at the a.c. outlet 5 is in the positive half wave, only the semiconductor switching element 1 is operated. The semiconductor switching element 2 remains permanently blocked. In no case can a short circuit take place between the positive pole U+ and the negative pole U_ of the d.c. source.

At the end of the positive half wave, the current at the a.c. outlet approaches zero. In this range, the current converter 14 can no longer determine reliably whether the current has a positive or a negative direction. Accordingly, the control logic produces at both of its outlets 17, 18 a signal with the logic value of one. Consequently, both blocking means 8, 9 for the control signal are brought to the pass condition. The operating signal 11 now reaches the control electrodes of both semiconductor switching elements 1, 2 by way of the retarding means 12, 13 which are now both switched to a long delay period. The semiconductor switching elements are now conventionally operated for a short period, i.e. for the time required by the current to leave the narrow range about the value zero in the negative direction. Thereafter, the current converter 14 can again reliably determine that only a negative current flows at the a.c. outlet 5, i.e. the current flows from the load into the inverter. During the negative half wave, the blocking means 8 are blocked for the upper semiconductor switching element 1 and the operating signal 11 only reaches the semiconductor switching element 2 by way of the blocking means 9 and the retarding means 12. Both semiconductor switching elements 1, 2 are alternately operated even if the effective value of the current at the a.c. outlet is substantially equal to zero.

With an inductive load, there is a phases displacement between the current and voltage. In this case, it can happen, that a positive voltage is applied to the load whilst a negative current is flowing. As long as a negative current flows, it is immaterial whether or not the semiconductor switching element 1 can be operated because in this condition no current can flow through the semiconductor switching element 1. The required current is in this case fed by way of the recovery diode 4 which is connected in parallel to the lower semiconductor switching element 2. For the converse case, mainly negative voltage with positive current, the current distribution is exactly the opposite, i.e. the upper recovery diode 3 carries the current whilst it is immaterial whether or not the lower semiconductor switching element 2 can be operated. It is only when the current has become positive again, i.e. the semiconductor switching element 1 could also carry a current, that it will be fed with the operating signal 11 in order intermittently to produce a conductive connection between the positive pole of the d.c. source U+ and the a.c. outlet 5.

The retarding means 12, 13 could in principle also be omitted. However, since the switching off period is in most cases larger than the switching on period, the scanning ratio and thus the outlet voltage of the inverter would become larger than desired. For this reason, the retarding means 12, 13 have a delay corresponding to the switching off period of the semiconductor switching elements 1, 2. The delay period must not, however, be selected to be any greater, whereby excessive dead periods are avoided. An exception is made in the region where the current has a value approximately equal to zero. In this range it is difficult for the current converter 14 to determine reliably whether the current has a positive or negative polarity. Both blocking means 8, 9 are therefore released and the operating signal 11 is transmitted to both semiconductor switching elements 1, 2. In order to prevent a short circuit between the two poles U+ and U_ of the d.c. source also in this operating condition, the retarding means 12, 13 are set to a long delay period, i.e. a delay period amounting to a multiple of the switching off period of the semiconductor switching elements 1, 2. Since the retarding means are always operated depending on the condition of the blocking means associated with the other semiconductor switching element 1, 2, one ensures that a long delay period is always set for both retarding means 12, 13 even if both blocking means 8, 9 drive the control signal 11 to the semiconductor switching elements 1, 2.

Naturally, the scanning ratio of the operating signal 11 may vary with any other time function to produce an inverter outlet voltage which varies in time according to the same function. In every case, one ensures that, while avoiding a short circuit situation between the two poles of the d.c. source, an inverter outlet voltage is produced that substantially corresponds to the desired voltage.

I claim:

1. An inverter circuit for converting d.c. from a d.c. source having positive and negative poles to at least single phase a.c., comprising, first and second semiconductor switching elements for each said phase connected in series between said poles, an a.c. output between said switching elements, recovery diodes in respective parallel relation to said switching elements disposed in blocking directions relative to said d.c. source, signal generating means providing a pulse width modulated operating signal for operating said switching elements, first and second blocking means for effecting respective control of said switching elements with each of said blocking means having an input effectively connected to said signal generating means and respective outputs respectively connected to said first and second switching elements, and control means including current directing sensing means responsive to current flow at said a.c. output for selectively effecting nonblocking of said first and second blocking means in accordance with the direction of current flow at said a.c. output, said control means operating to effect nonblocking of both of said blocking means when the current flow at said a.c. output is in a narrow range on both sides of zero.

2. An inverter circuit in accordance with claim 1 wherein said first and second blocking means is in the form of AND gates.

3. An inverter circuit in accordance with claim 1 wherein said control means includes first and second comparator means between said current sensing means and said first and second blocking means, said comparator means being respectively responsive to current flow of opposite polarities at said a.c. output.

4. An inverter circuit in accordance with claim 1 wherein said pulse width modulated signal respectively operates said switching elements with rising and falling flanks thereof.

5. An inverter circuit in accordance with claim 1 including first and second time delay means respectively between said first and second blocking means and said first and second switching elements.

6. An inverter circuit in accordance with claim 5 wherein said control means effects alternately shorter and longer predetermined delay periods for said time delay means corresponding respectively to the enabling and disabling of said first and second blocking means.

* * * * *